United States Patent
Krupkin et al.

(10) Patent No.: US 9,313,108 B2
(45) Date of Patent: Apr. 12, 2016

(54) FLEXIBLE AND SCALABLE METHOD AND APPARATUS FOR DYNAMIC SUBSCRIBER SERVICES CONFIGURATION AND MANAGEMENT

(75) Inventors: Michail Krupkin, New Westminister (CA); Sudhagar Chinnaswamy, Milpitas, CA (US)

(73) Assignee: ERICSSON AB, Stockholm (SE)

(*) Notice: Subject to any disclaimer, the term of this patent is extended or adjusted under 35 U.S.C. 154(b) by 958 days.

(21) Appl. No.: 11/957,288

(22) Filed: Dec. 14, 2007

(65) Prior Publication Data
US 2009/0157852 A1 Jun. 18, 2009

(51) Int. Cl.
*G06F 15/16* (2006.01)
*H04L 12/24* (2006.01)
*G06F 15/177* (2006.01)

(52) U.S. Cl.
CPC .......... *H04L 41/5054* (2013.01); *G06F 15/177* (2013.01)

(58) Field of Classification Search
CPC .................... H04L 41/5054; G06F 15/177
USPC ........................................................ 709/220
See application file for complete search history.

(56) References Cited

U.S. PATENT DOCUMENTS

| | | | | |
|---|---|---|---|---|
| 5,491,796 A * | 2/1996 | Wanderer et al. | ............. | 709/224 |
| 5,774,689 A * | 6/1998 | Curtis et al. | ..................... | 703/21 |
| 6,076,952 A * | 6/2000 | Gretta et al. | ..................... | 700/83 |
| 6,314,460 B1 * | 11/2001 | Knight et al. | .................. | 709/220 |
| 6,321,259 B1 * | 11/2001 | Ouellette et al. | ............... | 709/220 |
| 6,341,321 B1 * | 1/2002 | Glassen et al. | ................. | 710/104 |
| 6,360,262 B1 * | 3/2002 | Guenthner et al. | ........... | 709/226 |
| 6,366,577 B1 * | 4/2002 | Donovan | ........................ | 370/352 |
| 6,421,719 B1 * | 7/2002 | Lewis et al. | .................... | 709/224 |
| 6,574,663 B1 * | 6/2003 | Bakshi et al. | ................. | 709/223 |
| 6,577,628 B1 * | 6/2003 | Hejza | ............................ | 370/392 |
| 6,581,094 B1 * | 6/2003 | Gao | ............................... | 709/220 |
| 6,637,020 B1 * | 10/2003 | Hammond | ..................... | 717/107 |
| 6,687,220 B1 * | 2/2004 | Ayres | ............................ | 370/229 |
| 6,792,605 B1 * | 9/2004 | Roberts et al. | ................ | 719/313 |
| 6,857,012 B2 * | 2/2005 | Sim et al. | ....................... | 709/222 |
| 6,917,617 B2 * | 7/2005 | Jin et al. | .................... | 370/395.21 |
| 6,954,800 B2 * | 10/2005 | Mallory | ......................... | 709/240 |
| 6,957,294 B1 * | 10/2005 | Saunders et al. | .................. | 711/4 |
| 6,977,896 B1 * | 12/2005 | Kobayashi | ...................... | 370/235 |
| 7,047,088 B2 * | 5/2006 | Nakamura et al. | .............. | 700/19 |
| 7,185,070 B2 * | 2/2007 | Paul et al. | ..................... | 709/220 |
| 7,523,175 B1 * | 4/2009 | Iyer et al. | ...................... | 709/220 |
| 7,603,445 B1 * | 10/2009 | Fehrle | ............................ | 709/220 |
| 7,743,147 B2 * | 6/2010 | Suorsa et al. | .................. | 709/226 |
| 8,082,432 B2 * | 12/2011 | Fehrle | .............................. | 713/1 |
| 8,478,861 B2 * | 7/2013 | Taylor et al. | ................... | 709/224 |
| 2001/0051980 A1 * | 12/2001 | Raciborski et al. | ........... | 709/203 |
| 2002/0059404 A1 * | 5/2002 | Schaaf et al. | .................. | 709/220 |
| 2002/0174219 A1 * | 11/2002 | Mei et al. | ....................... | 709/224 |
| 2002/0176378 A1 * | 11/2002 | Hamilton et al. | ............. | 370/328 |
| 2003/0033379 A1 * | 2/2003 | Civanlar et al. | ............... | 709/218 |
| 2003/0055882 A1 * | 3/2003 | Kawamura | ..................... | 709/203 |
| 2003/0110228 A1 * | 6/2003 | Xu et al. | ........................ | 709/207 |

(Continued)

*Primary Examiner* — Krista Zele
*Assistant Examiner* — Anthony Fabbri
(74) *Attorney, Agent, or Firm* — Nicholson De Vos Webster & Elliott, LLP

(57) ABSTRACT

A method and apparatus is described for configuring a network element for providing services for subscribers by dynamically generating a set of one or more internal network attributes based on a set of relatively simple attributes passed from a server.

18 Claims, 5 Drawing Sheets

(56) References Cited

U.S. PATENT DOCUMENTS

| | | | |
|---|---|---|---|
| 2004/0260951 A1* | 12/2004 | Madour | H04W 28/18 726/22 |
| 2004/0267910 A1* | 12/2004 | Treppa et al. | 709/220 |
| 2005/0108366 A1* | 5/2005 | Bodin et al. | 709/220 |
| 2005/0160154 A1* | 7/2005 | Raciborski et al. | 709/219 |
| 2005/0267969 A1* | 12/2005 | Poikselka et al. | 709/225 |
| 2005/0278441 A1* | 12/2005 | Bond et al. | 709/223 |
| 2006/0050862 A1* | 3/2006 | Shen et al. | 379/219 |
| 2006/0149845 A1* | 7/2006 | Malin et al. | 709/228 |
| 2006/0165103 A1* | 7/2006 | Trudeau et al. | 370/401 |
| 2006/0187900 A1* | 8/2006 | Akbar | 370/352 |
| 2006/0253557 A1* | 11/2006 | Talayco et al. | 709/220 |
| 2006/0259595 A1* | 11/2006 | Talayco | 709/220 |
| 2007/0124433 A1* | 5/2007 | Frost et al. | 709/220 |
| 2013/0185767 A1* | 7/2013 | Tirupachur Comerica | H04L 63/08 726/4 |

* cited by examiner

FLEXIBLE AND SCALABLE METHOD AND APPARATUS FOR DYNAMIC SUBSCRIBER SERVICES CONFIGURATION AND MANAGEMENT

FIELD OF THE INVENTION

The invention relates to the transmission of data over communications networks. More specifically, the invention relates to managing services and accounting for services for subscribers in a network.

BACKGROUND OF THE INVENTION

With the growing popularity of the Internet and the World Wide Web, the volume of traffic over networks has substantially increased. As a result, the need for maintaining an efficient flow of information over data communication networks has become increasingly important. Due to the inherent limitations of network infrastructures, network bandwidth (a measure of the capacity of a communications channel) is limited. Network providers pay for network utilization, and, consequently, pass at least some of these costs on to their subscribers. Typically, subscribers of network services utilize a myriad of applications and receive a variety of services over networks. For example, subscribers may run real-time applications such as, but not limited to, Video On Demand (VOD), Voice over Internet Protocol (VoIP), Walled Garden, Premium Data, and etc. VOD is a technology where users can demand a selected video, such as a movie, be played over the network. Similarly, VoIP is a technology used to transmit voice conversations over a data networks using an Internet Protocol. These technologies require a router or other network element to provide the services to subscribers over a network, such as a data network. Typically, real-time applications such as VOD and VoIP involve transmitting and receiving IP packets that require relatively large bandwidth, short latency jitter, and a reasonably small data loss ratio.

Often subscribers want a certain bandwidth and connection rate to run their applications. In order to guarantee a certain connection and data rate, service providers provide levels of "Quality of Service" (QoS) which is a generic term used for expressing the measuring and maintaining of the quality of a network channel. QoS involves the idea that transmission rates, error rates, and other characteristics of quality of a network can be measured, improved, and, to some extent, guaranteed in advance. One problem that has arisen is that, since service providers charge a fee for bandwidth utilization, subscribers often pay different amounts for different levels or classes of services. Providing accounting for these different levels of QoS for each subscriber can often lead to difficult and complex problems configuring and managing both the services themselves as well as the accounting for those services for each subscriber.

One solution has been to establish support for services and accounting for services within the network element (e.g., a bridge or router) that receives individual subscriber records containing information for each subscriber from a remote server (e.g., through remote authentication dial-in user service or Radius). To do this requires configuring a set of internal network attributes within the network element to provide support for services and accounting for services. These internal network element attributes include such things as port descriptions, network interfaces, data rate, volume limit, other traffic policies, and so on. The network attributes are used for configuring the network element for services and accounting for services. As such, these attributes are subscriber-specific depending on the subscriber's level of service, and must be configured on a per-subscriber basis. Unfortunately, as the number and types of services has increased over time, so has the number and complexity of the network attributes that must be configured within the network element. Thus, service management has become a difficult task because of the complex internal network element attributes required to configure services and accounting for services for each subscriber. Additionally, the attributes are exposed to network server administrators who must manage the associated subscriber databases at the server. As a result, administrators have to understand the complex internal attributes of the network element as well as all the interdependencies between the complex internal attributes to properly configure services and accounting for services for each subscriber on the network element. This problem is compounded when a subscriber requires a change in services or deactivation of services. Change of services and/or deactivation of services involves the update to numerous internal attributes and their interdependent attributes. This component is increasingly complex and prone to human error.

Additionally, the server must store all the internal network element attributes and must pass them to the network element using messaging over the network. Consequently, the size and frequency of messages that must be passed between the server and the network element which manages subscriber access to services is becoming increasingly large and the processing logic is becoming increasingly complex.

For example, FIG. 1A illustrates an exemplary network element communicating subscriber-specific services information with a server using complex internal network attributes according to the prior art. FIG. 1A includes network element 101, subscribers 135 and Radius server 125. Network element 101 further includes packet processors 111-114 and control card 123. Control card 123 includes feature managers 140 including back-end components QoS 141 and CLS 143 running within control card 123. Back-end components such as QoS 141 and CLS 143 perform, among other things, the "Quality of Service" and other IP policy filtering of network traffic. Control card 123 further includes authentication, authorization, and accounting (AAA) component 122 which contains local configuration files, including local config file_0 150 and local config file_1 151. These local configuration files contain, among other things, the set of network element internal attributes for configuring the services and accounting for services for each subscriber on network element 101. For example, local config file_0 150 includes local per-subscriber memory 155. Local per-subscriber memory 155 includes complex internal attributes which are used to configure services and accounting for services on network element 101 for the particular subscriber corresponding to local config_0 file 150. Each of these complex internal attributes could include, for example, port descriptions, network interfaces, or other traffic policies, and are used for configuring services on a network element for associated subscribers.

In order to configure the network to support services and accounting for services, Radius server 125 sends a set of complex Radius service attributes 126 contained within a subscriber record of subscriber records 129 corresponding to the subscriber who requires activation and/or deactivation of services. For example, there may be an activation or deactivation request initiated by the subscriber that causes the network to be reconfigured for that particular subscriber. In such a case, the subscriber's records located in subscriber records 129 are updated and sent as Radius service attributes 126 to the network element so that the services can be configured/ re-configured. These Radius service attributes 126 are received at AAA component 122 and stored into the local per-subscriber memory 155 corresponding to the local configuration file, local config file_0 associated with the subscriber requiring a change of services.

The Radius service attributes 126 are the same attributes as the complex internal attributes stored in the local per-subscriber memory 155 for each subscriber. That is, the Radius service attributes 126 are copied directly from subscriber records 129 and stored into the local per-subscriber memory 155 of local config file_0. The Radius service attributes 126 are complex subscriber-specific attributes to configure services within network element 101. These are the internal attributes required to provide the level of services for the corresponding subscriber on the network. However, as discussed above, when the level and quantity of services offered by service providers increases, so does the amount and complexity of these internal network element attributes contained within the attribute list maintained within AAA component 122. These complex attributes must be configured by administrators (not shown) at Radius server 125. Radius server 125 includes a set of subscriber records 129 corresponding to each subscriber currently subscribed to the network. Subscriber records 129 include various strings used by network administrators to configure the services and accounting for services in network element 101. For example, subscriber records 129 includes strings of attribute names and attribute values such as IP-filter, rate limit, and many others including vendor specific attributes. In order to provide support for services and accounting for services, the administrators at server 125 must configure subscriber records 129 to provide the appropriate internal attributes to the network element such as network element 101. As a result, the administrators must be well-versed in the internal attributes of the network element. Moreover, when a subscriber changes his or her service level or requests additional or different services, subscriber records 129 must be re-configured. As discussed above, the complexity and interdependency of configuring subscriber services and accounting for services in this way is inefficient and prone to human error.

SUMMARY OF THE INVENTION

Methods, machine-readable media, and apparatuses for configuring a network element to provide services to a plurality of subscribers are described. In one embodiment, a set of one or more service attributes are received from a server and used to dynamically generate internal network attributes, the internal network attributes being used to configure the network element to provide network services and accounting for services for subscribers.

BRIEF DESCRIPTION OF THE DRAWINGS

A better understanding of the present invention can be obtained from the following detailed description in conjunction with the following drawings, in which.

DETAILED DESCRIPTION

Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of embodiments of the present invention.

A flexible/scalable method and apparatus for dynamic subscriber service configuration and management is described. Prior art systems do not dynamically convert simple network attributes from a server, such as a Radius server, into complex internal attributes. In order to configure a network for services and accounting for services, prior art systems required passing complex attributes from the Radius server to the network element. Many of these prior art attributes, however, are overly complicated and interdependent, and must be configured by network administrators (users) at the server resulting in inefficiency and human error. At least certain embodiments provide a method, computer-readable medium, and apparatus to dynamically generate a set of one or more internal network attributes based on simple service attributes received from a server. This reduces the complexity of the attributes stored at the server and reduces network processing and message passing over the network.

Figure 1A:
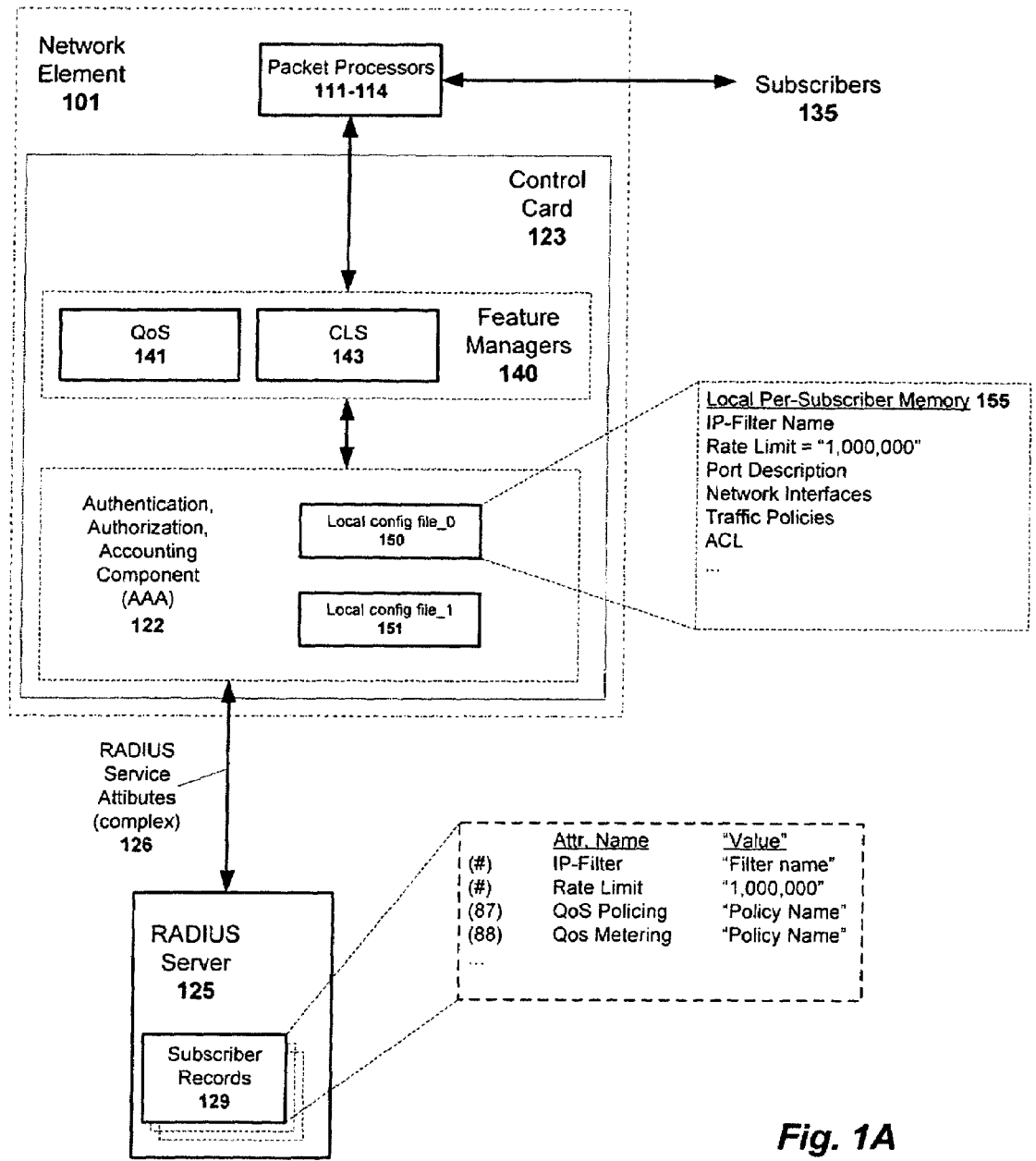
FIG. 1A illustrates an exemplary network element communicating subscriber-specific services information with a server using complex internal network attributes according to the prior art.
Figure 1B:
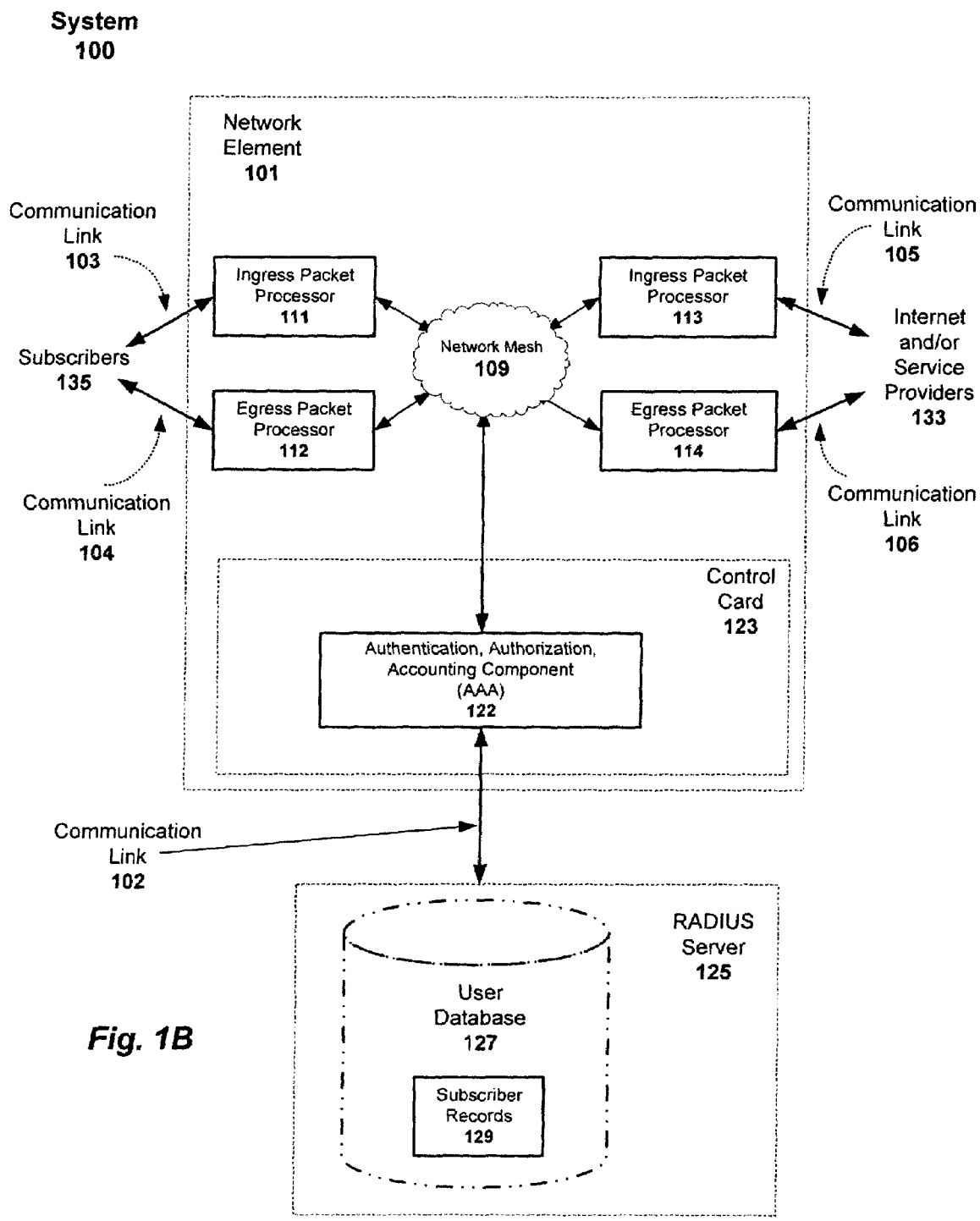
FIG. 1B illustrates a conceptual model of a system upon which features of the invention may be implemented.

FIG. 1B illustrates a conceptual model of an exemplary system upon which features of the invention may be implemented. Exemplary system 100 illustrates a system for connecting subscribers 135 with the Internet and/or services providers 133. For the purposes of this application, service providers may be any the following: a company which provides subscribers with an Internet gateway and/or Internet content; a telecommunications company which provides network infrastructure; a company or firm which provides a virtual private network (VPN) connection to its employees; or any network-addressable entity that accepts and executes requests from consumers. It can be a mainframe system, a component, or some other type of software or hardware system that executes service requests.

In FIG. 1B, network element 101 communicates with Radius server 125 across communication link 102. Various information, such as network traffic volume limits and policies, is communicated. A Radius protocol is used to facilitate the information exchange over this interface. Radius uses UDP/IP as the transport protocol. As discussed with respect to FIG. 1A, the Radius server provides the subscriber-specific information through Radius attributes to the network element, such as network element 101. Network element 101 also includes a number of packet processors including ingress packet processors 111 and 112, and egress packet processors 113 and 114 for receiving and forwarding data packets across the network. That is, network element 101 provides a channel of communication between subscribers 135 and the Internet and/or service providers 133 via the various ingress packet processors 111 and 112, and egress packet processors 113 and 114 across a network mesh such as network mesh 109, which may be any network mesh known in the art. For example, network mesh 109 may be a switch fabric, which includes a full mesh such that each of ingress processors 111 and 112, and egress processors 113 and 114 are coupled to one another. Further, network element 101 includes control card 123 which includes AAA component 122. AAA component 122, in one embodiment, is a BSD component. BSD components refer to any software or firmware component known in the art as Berkeley Software Distribution (BSD) component of a UNIX operating system, also referred to as BSD UNIX. Control card 123 is also coupled to each of the ingress and egress packet processors 111, 112, 113 and 114 through Network Mesh 109.

AAA component 122 of control card 123 performs the three primary services required by a Radius server such as Radius Server 125. All authentication, authorization, and accounting are performed by AAA component 122. Essentially, an AAA handles user requests for access to network resources and provides authentication, authorization and accounting services. The AAA component typically interacts with network access and gateway servers and with databases and directories containing user information. The user information may include a particular subscriber's bandwidth utilization, network traffic volume limits, and other user-specific information. Authentication, authorization, and accounting is a term for a framework for intelligently controlling access to network resources, enforcing policies, auditing usage, and providing information necessary to bill for services. These combined processes are considered information for effective network management and security. Authentication is essentially proving who you are. That is, authentication provides a way of identifying a user, typically by having the user enter a valid username and password before access is granted. The process of authentication is based on each user having a unique set of criteria for gaining access. The AAA component compares a user's authentication credentials with the credentials stored in a database. If the credentials match, the user is granted access to the network. If the credentials don't match, authentication fails and network access is denied. Following authentication, a user must gain authorization for doing certain tasks. Authorization is defining what a subscriber is and is not allowed to do. After logging into a system, for example, the user may try to issue commands. The authorization process determines whether the user has the authority to issue such commands. In this way, authorization is the component of enforcing policies and determining what types or qualities of activities, resources, or services a user is permitted. Usually, authorization occurs within the context of authentication. Once you have authenticated a user, they may be authorized for different types of access or activity. Finally, accounting measures the resources a user consumes during the access. This can include the amount of system time and the amount of data a user has sent and/or received during a session. Accounting is carried out by logging session statistics and usage information and is typically used for authorization control, billing, trend analysis, resource utilization, and/or capacity planning activities.

Figure 2:
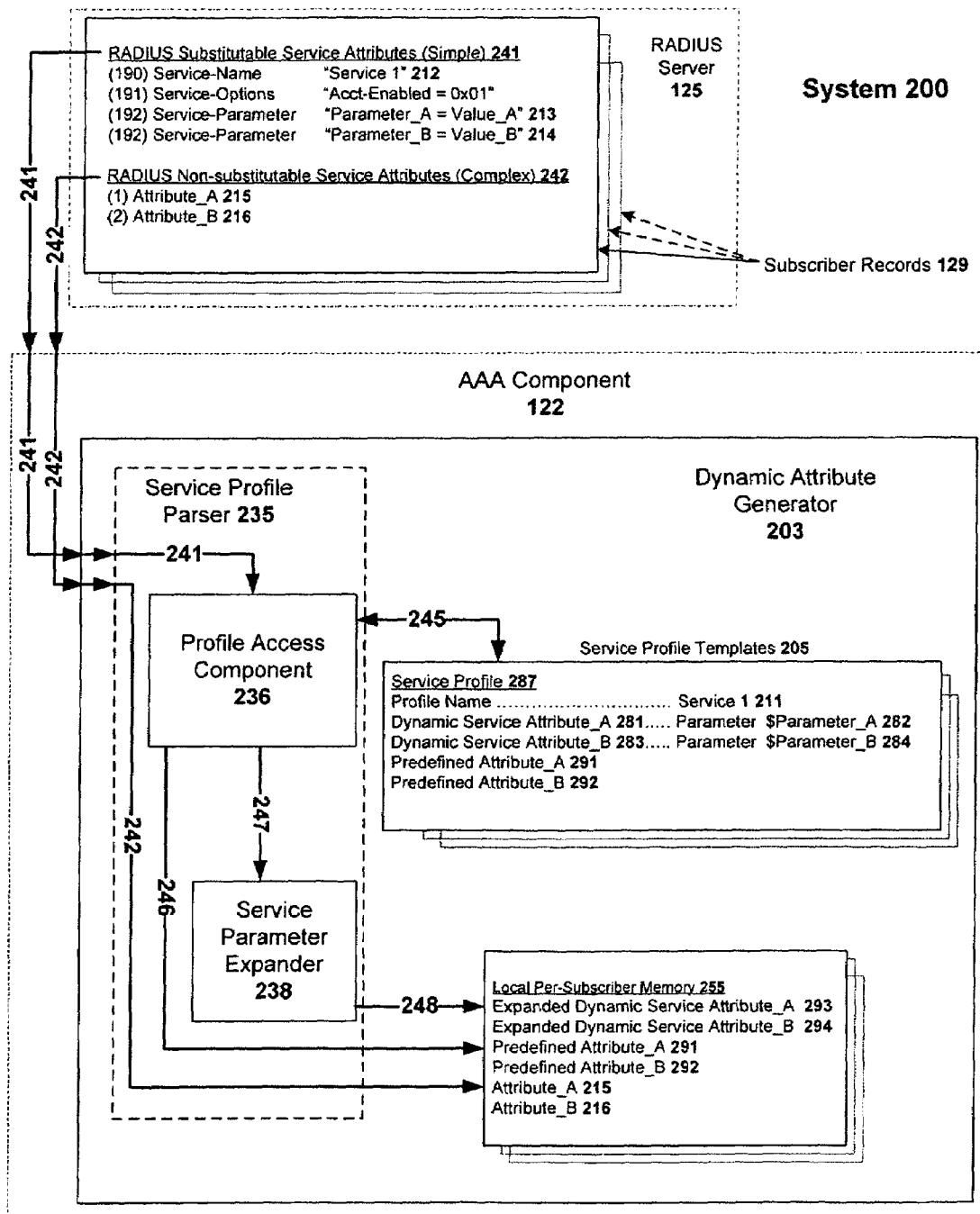
FIG. 2 illustrates conceptual model of an exemplary system for configuring a network element for services using dynamically generated internal network attributes according to one embodiment of the invention.

FIG. 2 illustrates a conceptual model of an exemplary system for configuring a network element for services using dynamically generated internal network attributes according to one embodiment of the invention. Exemplary system 200 includes Radius server 125 and AAA component 122 within a network element (not shown). Radius server 125 includes subscriber records 129. Each of subscriber records 129 is one of a plurality of subscriber records stored at server 125 corresponding to the particular subscriber to the network services provided by the server 125. Each subscriber record of subscriber records 129, in one embodiment, may include a set of Radius substitutable service attributes 241 (simple) for configuring services and accounting for services for subscribers on the network and a set of Radius non-substitutable service attributes 242 (complex) for configuring services for subscribers on the network. The Radius substitutable service attributes 241 are simple attributes that are converted into complex internal attributes to configure services and accounting for services on a network element. In this example, Radius substitutable service attributes 241 include service-name (190), service-options (191), and optional service-parameters (192).

The Radius non-substitutable service attributes 242, on the other hand, are complex and are the same as Radius service attributes 126 described above with respect to FIG. 1A. These attributes were used in prior art systems to configure services for subscribers on the network. As discussed above, these attributes became increasingly complex as various services were added for subscribers on the network. The Radius substitutable service attributes 241 were created to alleviate this problem by establishing a set of simple, user-friendly attributes with optional user-configurable parameters that are dynamically expanded into a set of complex internal attributes once they reach the AAA component 122 within the network element. Radius non-substitutable service attributes 242, however, are still available and are provided as an option to user (network administrators). That is, the complex Radius non-substitutable service attributes 242 may still be configured by the network administrators at server 125 and are, in at least certain embodiments, designed to work in conjunction with the new Radius substitutable service attributes 241 for configuring services and accounting for services for subscribers on the network element. However, the principles of the invention may be used with or without the addition of the complex Radius server attributes 126.

AAA component 122 is the component at the interface with Radius server 125 and is responsible for the communication between the Radius server 125 and the network element. AAA component 122 includes dynamic attribute generator 203, which further includes service profile template 205 and service profile parser 235. The service profile template 205 includes a plurality of service profiles maintained in template format within the AAA component 122. Service profiles within service profile templates 205 include, for example, a service profile such as service profile 287. In certain embodiments, the service profiles such as service profile 287 correspond to a particular network service or services to be configured on the network element. Service profiles such as service profile 287, in at least certain embodiments, provide a master placeholder to store service information associated with the service or services to be configured on the network element. For example, a service profile may contain service information such as the profile name, dynamic service attributes, and, optionally, service parameters This service information is not visible to the administrators at the server 125 because, under the principles of the invention, the only information the network administrators at server 125 need to be aware of is the simple Radius substitutable service attributes 241. These simple attributes are configured at the server 125. The rest of the service-related information is dynamically generated within the network element.

In the example of service profile 287, the profile name is "service 1" 211 which corresponds to the service-name, "service 1" 212 of Radius substitutable service attributes 241 sent from server 125. Service profile 287 also includes dynamic service attributes such as dynamic service attribute_A 281 and dynamic service attribute_B 283. Each of the dynamic service attributes, in at least certain embodiments, may be configured to receive service parameters from server 125. In this example, dynamic service attribute_A 281 is configured to receive service parameter_A 282 corresponding to parameter_A 213 of the received Radius substitutable service attributes 241, and dynamic service attribute_B 283 is configured to receive service parameter_B 284 corresponding to parameter_B 214 of the received Radius substitutable service attributes 241. It should be noted that this is given by way of example and not limitation. The dynamic service attributes within a service profile may be configured to receive more or fewer service parameters passed from server 125.

Service profile 287 further includes, in at least certain embodiments, predefined attributes such as predefined attribute_A 291 and predefined attribute_B 292. Predefined attribute_A 291 and predefined attribute_B 292 are static service attributes which are associated with the service or services to be provided. The term static means that the predefined attributes, such as predefined attribute_A 291 and predefined attribute_B 292, are provided to configure the network for services without dynamic generation. Thus, server administrators (users) have the option of including a set of predefined static internal attributes such as predefined attribute_A 291 and predefined attribute_B 292 along with the dynamic service attributes such as dynamic service attribute_A 281 and dynamic service attribute_B 283 for each service profile of service profile templates 205. Whenever a service profile such as service profile 287 of service profile templates 205 is accessed, the associated predefined attributes in one embodiment may be used in conjunction with the dynamic service attributes to configure services and accounting for services for subscribers on the network element.

Whenever a subscriber on the network activates/deactivates services, these services must be configured on the network element. Service profile template 205 supports a template configuration with user-defined parameters. In operation, Radius substitutable service attributes 241 and Radius non-substitutable service attributes 242 are configured by network administrators at server 125 for each subscriber. This information is stored in the subscriber record of subscriber records 129 for each subscriber. The Radius substitutable service attributes 241 are simple user-friendly attributes which, in at least certain embodiments, are used to dynamically generate a set of complex internal attributes to configure the network element for services. The Radius non-substitutable service attributes 242, on the other hand, are complex and are the same attributes as the complex Radius service attributes 126 of prior art FIG. 1A. Radius substitutable service attributes 241 and Radius non-substitutable service attributes 242 are then passed over a network to the AAA component 122 of the network element. Service profile parser 235 comprises a profile access component 236 and a service parameter expander 238. The passed Radius substitutable service attributes 241 and Radius non-substitutable service attributes 242 are received by the profile access component 236 of the service profile parser 235 within AAA component 122 over lines 241 and 242 respectively. In at least certain embodiments, profile access component 236 detects the Radius substitutable service attributes 241 from the set of received attributes. Whenever the profile access component 236 detects these Radius substitutable service attributes 241, profile access component 236 performs an access to the appropriate service profile within service profile templates 205. The profile access component 236 accesses the appropriate service profile of service profile templates 205 corresponding to the received Radius substitutable service attributes 241 over line 245. Specifically, this access retrieves the service profile within service profile templates 205 corresponding to the "service-name" information received the Radius substitutable service attributes 241. The profile access component 236 locates and accesses the service profile of service profile templates 205 that includes the "profile name" of the service profile matching the "service-name" associated with the received with Radius substitutable service attributes 241. In this example, profile 287 is accessed because it contains profile name "service 1" 211 which corresponds to service-name "service 1" 212 of the received Radius substitutable service attributes 241. Once the appropriate service profile has been accessed, the values of the service parameters received from the server, such as value_A of parameter_A 213 and value_B of parameter_B 214, are stored into the corresponding service parameter locations, parameter_A 282 and parameter_B 284 respectively, within service profile 287. Parameter_A 282 and parameter_B 284 correspond to the dynamic service attributes of the service profile 287. In this example, parameter_A 282 corresponds to the dynamic service attribute_A 281 and parameter_B 284 corresponds to the dynamic service attribute_B 283.

The service information contained within the service profile, including the dynamic service attributes, the parameter values, and the predefined attributes, is passed back to the profile access component 236 over line 245. The profile access component 236 then passes the dynamic service attributes and corresponding parameter values to the service parameter expander component 238 over line 247. The service parameter expander component 238 receives the dynamic service attributes and corresponding parameter values and dynamically generates a set of internal attributes for configuring the network element for services and accounting for services based on these attributes. This generating includes substituting the parameter values into the appropriate locations within the received dynamic service attributes. The value of parameter_A 282, therefore, is substituted into the appropriate locations within dynamic service attribute_A 281, and the value of parameter_B 284 is substituted into the appropriate locations within dynamic service attribute_B 283. In at least certain embodiments, the parameter values, such as parameter_A 282 and parameter_B 284 are converted into the data type of the particular dynamic service attribute. For example, in embodiments where the dynamic service parameters are integers, the parameter values are converted into integers. In other embodiments where the dynamic service parameters are strings, the parameter values are converted to string data types and placed appropriately within the string. It should be noted, however, that although the invention is discussed with respect to integers and strings, the invention is not limited to these data types as other data types such as tagged strings, real and/or complex numbers, and so on are contemplated and are within the scope of the invention. In at least one embodiment, once the values of the parameters have been converted to the appropriate data type and placed within the appropriate locations within the dynamic service attributes, the dynamic generation of the internal attributes for configuring services and accounting for services on the network element is complete. The generated internal attributes are then passed to and stored in the local per-subscriber memory 255 over line 248. Local per-subscriber memory 255 is the same as local per-subscriber memory 155 of FIG. 1A.

The predefined attributes, such as predefined attribute_A 291 and predefined attribute_B 292, which were also passed back to the profile access component 236, however, do not get routed to the service parameter expander 238. Rather, since the predefined attributes are already in complex internal attribute format, they do not need to go through the dynamic generation process. As such, the predefined attributes are passed over line 246 and stored directly into the local per-subscriber memory 255.

In this manner, the service profiles of service profile templates 205 are used in conjunction with the service profile parser 235 to invoke service profiles, to expand Radius substitutable service attributes, and to store complex internal attributes into the local per-subscriber memory 255 for each subscriber. In so doing, the service profile templates 205 provide an easy and convenient way for network administrators to configure services and accounting for services for subscribers on the network. The service parameters may be optional or mandatory. If a mandatory service parameter is missing, an error message will be generated and sent back to server 125. If an optional service parameter is missing, a default value will be applied and no error message will be generated. Using the dynamic attribute generation of this invention, the internal subscriber records associated with each subscriber will be configured with the correct attributes for providing support for services and accounting for services. Radius substitutable attributes 241, therefore, are received from Radius server 125 in order to configure the network element, such as network element 101 of FIG. 1A, for providing services and accounting for services to a plurality of subscribers. As discussed above, in at least certain embodiments the invention is an extension of the Radius-based policy functionality carried out within the network element itself.

Using such a system, customers can enable multiple services within a single subscriber session. Services can be activated and/or deactivated dynamically and independently through Radius messages, such as Radius substitutable service attributes 241. Whenever a subscriber desires a change in the level of service, Radius substitutable service attributes 241 are configured within Radius server 125 and passed to AAA component 122 to be stored within the service profile template 205. After receiving Radius substitutable service attributes 241, the service parameter expander component 238 of service profile parser 235 substitutes the parameter value in the service profile template 205 with the values received from Radius server 125, and forms a set of complex internal attributes to configure services and accounting for services for subscribers.

In one embodiment, new commands are added to the command line interface (CLI) for configuring the service profile templates, such as service profile templates 205. A CLI is a user interface to a computer's operating system or an application in which the user responds to a visual prompt by typing in a command on a specified line, receives a response back from the system, and then enters another command, and so forth. Service profiles of service profile templates 205 facilitate a template configuration for various AAA internal attributes and are place holders for the service parameters received from Radius server 125. The substituted Radius attributes within service profile template 205 include attributes which are simple and used to dynamically activate and/or deactivate the services with the parameters supplied from the Radius server 125 via these Radius substitutable service attributes 241. In this way, service configuration and management is simplified by supporting a template configuration with user-defined parameters and abstracting the complex attributes with simple (substitutable) ones.

Additionally, this abstracting leads to a reduced amount of required attributes which were previously located in the subscriber records 129 at Radius server 125. As discussed above, these internal attributes are not visible to the Radius server 125 allowing reduced message passing and processing at the Radius server. Essentially, the complex and interdependent attributes required to configure a network element for services, are carried on by the network element, such as network element 101 of FIG. 1A, behind the scenes and without any network administrator's intervention. The large number of Radius attributes required in prior art systems has been replaced with a small number of relatively simple Radius service attributes. These simple attributes are then converted into the complex internal attributes to configure the network element for subscriber services and service accounting. The complex Radius attributes of the prior art, such as Radius non-substitutable service attributes 242, may still be configured at Radius server 125 and sent to AAA component 122 where they are stored into local per-subscriber memory 255 corresponding to the internal subscriber records of local per-subscriber memory 255 for each subscriber. However, as discussed above, there are many attributes that were required to be passed in prior art systems in order to configure a network element for services. This requirement is no longer necessary under the principles of the invention because Radius substitutable service attributes 241 received from Radius server 125 are dynamically converted into complex Radius attributes and written into local per-subscriber memory 255. In this way, the invention provides a simplified, flexible, and customizable way of performing dynamic service management.

Likewise, when internal attributes stored within local per-subscriber memory 255 are passed back to Radius server 125 as messages from the network element, such as network element 101 of FIG. 1A, they are converted back from the complex internal attributes required to configure services and accounting into the simple (user-friendly) attributes such as Radius substitutable service attributes 241. Under this mechanism, the complex internal network element attributes are not ever visible to the administrators of Radius servers, such as Radius server 125. As a result, the network administrators do not need to be aware of the numerous and complex internal attributes. Administrators (or other users) do not need to manage these numerous attributes to activate and/or deactivate services as in prior art systems. Activation/deactivation no longer involves complex processing logic as before.

Also, when configuring services and/or accounting for services, the server 125 sends the Radius attributes (which includes both Radius substitutable service attributes 241 and Radius non-substitutable service attributes 242 of FIG. 2) to the profile access component 236 of service profile parser 235, which checks the format of the attributes received, checks the presence of all mandatory attributes, stores the received information, and sends the validated Radius attributes to their respective locations within the dynamic attribute generator 203 of AAA component 122. In the case of an invalid format or missing mandatory attribute, profile access component 236 sends the appropriate error message and cause back to server 125. Radius server 125 sends the Radius substitutable service attributes 241 and the Radius non-substitutable service attributes 242 associated with services to AAA component 122 using a change of authorization (COA) requests. Upon receiving the COA request, AAA component 122 checks whether the service is configured using the service name, performs a validation check, verifies the presence of service parameters, and substitutes the parameters as appropriate and generates the internal attributes.

Figure 3:
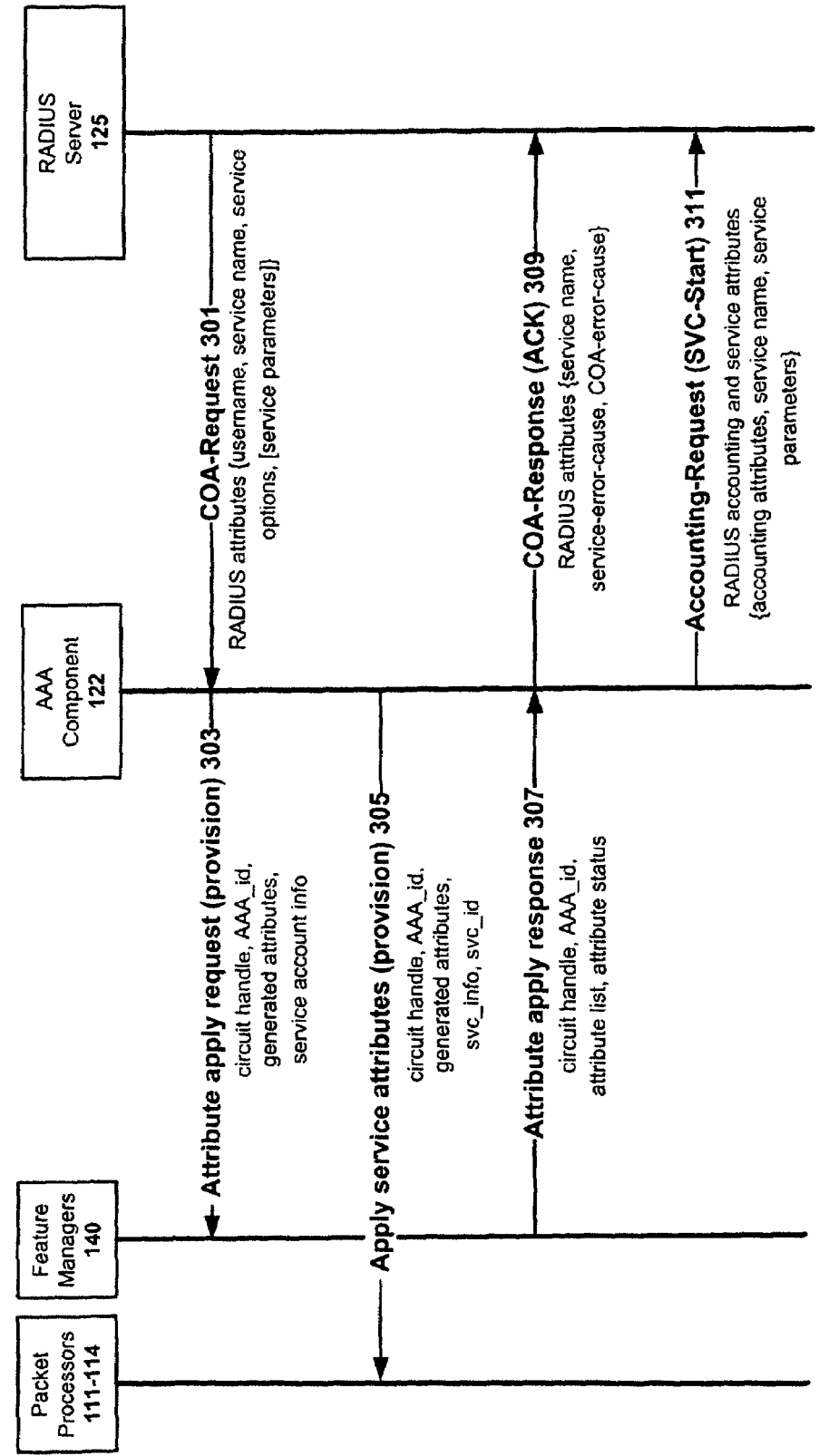
FIG. 3 illustrates a method of activating services within an exemplary network element according to one embodiment of the invention.

FIG. 3 illustrates a method of activating services within an exemplary network element according to one embodiment of the invention. In method 300, AAA component 122 receives a COA request, such as COA-request 301, from Radius server 125. COA-request 301 includes a set of one or more simple Radius attributes which provide subscriber specific services information. In one embodiment, COA-request 301 includes Radius attributes {username, service name, service options, [service parameters]}. After receiving COA-request 301, AAA component 122 dynamically generates a set of one or more internal network attributes to configure the network element for subscriber services. AAA component 122 sends attribute apply request (provision) 303 to feature managers 140. As discussed above, feature managers 140 includes back-end components QoS 141 and CLS 143 running within control card 123. Back-end components such as QoS 141 and CLS 143 perform, among other things, the "Quality of Service" and other IP policy filtering of network traffic. Attribute apply request 303 includes the dynamically generated attributes. In one embodiment, attribute apply request 303 includes circuit handle, AAA_id, generated attributes, and service accounting information. The circuit handle is an internal handle used to identify the subscriber session uniquely within the network element. A subscriber session typically refers to a lasting connection between a user (or user agent) and a peer, typically a server, usually involving the exchange of many packets between the user's computer and the server. The AAA_id is used to identify the subscriber session within the AAA component 122 of the network element. The service accounting information includes various network accounting policies and configurations associated with the services required by the subscriber.

Feature managers 140 include components running within the control card of the network element, such as network element 101 of FIG. 1A, to enforce network policies for each subscriber session. The feature managers 140 configure the packet processors to include service accounting information. Specifically, feature managers 140 modify the behavior of the packet processors such as packet processors 111-114 using the generated attributes received from AAA component 122. Additionally, AAA component 122 downloads apply service attributes (provision) 305 directly to packet processors 111-114. Apply service attributes 305 includes circuit handle, AAA_id, service info, and service ID. Apply service attributes 305 may also includes a service interim accounting interval attribute and a service volume limit attribute in order to enable packet processors 111-114 to push service accounting at regular intervals and provide notification when the network volume limit is reached for the particular subscriber. In response, feature managers 140 send attribute apply response 307 to AAA component 122. Attribute apply response 307 includes circuit handle, AAA_id, attribute list, and attribute status. In response to receiving attribute apply response 307, AAA component 122 sends COA-response (ACK) 309 to Radius proxy/service 125. COA-response 309 includes Radius attributes (service name, COA-error-cause, service-error-cause). Service-error-cause is a new Radius attribute that carries the error code (cause) for service management. This attribute is sent in COA-response 309 to indicate the result of service activation/deactivation requests. This attribute is mandatory in all COA-response packets and only one instance of this attribute can be present for a service. The following are the examples of possible error-cause values according to one embodiment of the invention: "service success," which indicates that the service request was handled successfully at network element 101; "missing attribute," which is sent if the mandatory Radius service attribute are not sent by the Radius server 125; and "invalid request," which is sent if the server attributes are not formed properly. COA-error-cause includes codes such as service "context not found," "resources unavailable," "generic service error," and "service already active." Finally, AAA component 122 sends accounting-request (SVC-start) 311 to Radius server 125. Accounting-request 311 includes Radius accounting attributes and service attributes (service name, parameters). Accounting-request 311 is sent in order to notify Radius server 125 that accounting is started/enabled for the particular service.

Figure 4:
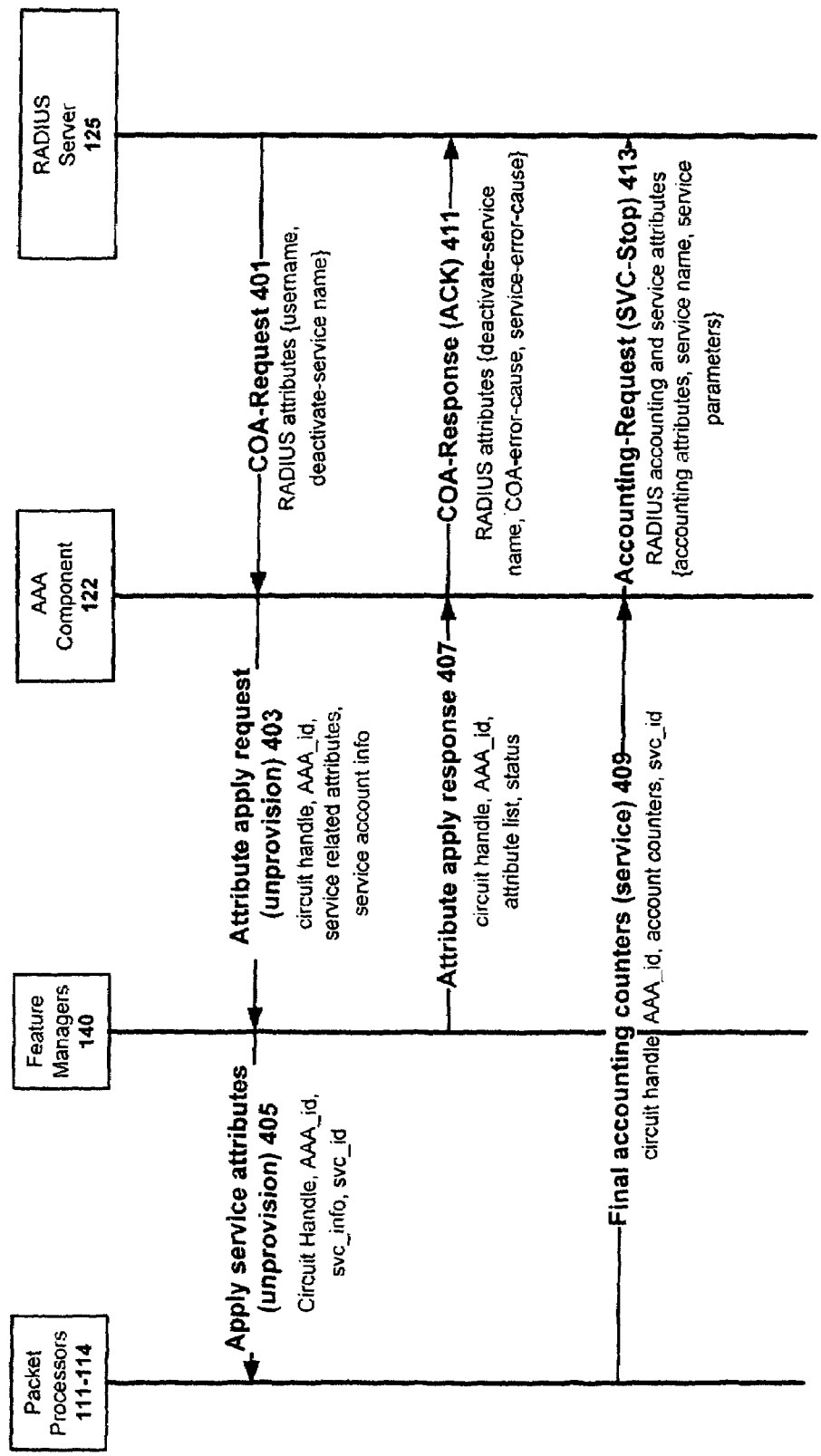
FIG. 4 illustrates a method of deactivating services within an exemplary network element according to one embodiment of the invention.

FIG. 4 illustrates a method of deactivating service within an exemplary network element according to one embodiment of the invention. In method 400, Radius server 125 sends COA-request 401 to AAA component 122 including Radius attributes {username, deactivate-service name}. In response, AAA component 122 finds all the internal attributes associated with the particular service using the service name. AAA component 122 may then send attribute apply request (unprovision) 403 to feature managers 140. Attributes apply request 403 includes, in one embodiment, circuit handle, AAA_id, service related attributes, and service accounting information. Additionally, apply service attributes (unprovision) 405 may be sent directly to packet processors 111-114. This may be performed by the feature managers 140; however, the invention is not so limited. Other BSD components running on the control card may be used to download the apply service attributes (unprovision) 405 to the packet processors 111-114. Apply service attributes 405 may include circuit handle, AAA_id, service info, and service ID. In response, feature managers 140 apply the attributes to the appropriate components of the network element and respond using attribute apply response 407. Attribute apply response 407 may include circuit handle, AAA_id, attribute list, and attribute status. Packet processors 111-114 may then send final accounting counters 409 to the AAA component 122. Final accounting counters 409 may include circuit handle, AAA_id, accounting counters, and service ID. In one embodiment, the final accounting counters are required on deactivation in order to notify the Radius server 125 of the amount of bandwidth and/or data rate consumed by the subscriber during the session. Packet processors 111-114 maintain counters (not shown) for determining the amount of network volume consumed by a subscriber during a particular interval. The packet processors 111-114, as discussed above, push the service accounting at regular intervals and notify AAA component 122 when the network traffic volume is reached. In the context of deactivation, packet processors 111-114 may be configured to release the final accounting counters via final accounting counters 409 even if the accounting interval has not been reached. This is done so the amount of bandwidth consumed by the subscriber can be reported to the Radius server 125 in order to support accounting for services. In response, AAA component 122 may send COA-response (ACK) 411 to Radius server 125. COA-response 411, in one embodiment, includes Radius attributes (deactivate service name, COA-error-cause, and service-error-cause). Finally, AAA component 122 may then send accounting-request (SVC-stop) 413 to Radius server 125. Accounting-request 413 may include both Radius accounting attributes, and service attributes (service name, and parameters).

In this manner, services are deactivated dynamically using the simple Radius attributes, which are used to identify a set of complex and interdependent internal attributes configured on components of the network element. Radius Service attributes such as activate-service name and deactivate-service name may be sent to the network element in order to activate and/or deactivate services respectively. Thus, Radius-based policy functionality is now performed within a network element, such as network element 101 of FIG. 1A, in order to enable customers to have support for multiple services within a single subscriber session. In at least certain embodiments, services and service accounting may be activated/deactivated dynamically and independently through Radius servers via COA-requests. These services could be offered by different Internet Service Providers (ISPs). In one embodiment, the messages must go through only one Radius server and the Radius server is only aware of the service name and associated parameters, and is not aware of the internals of the network element. However, the invention is not so limited as there could be a many to one relationship between servers and different ISPs.

Embodiments of the invention may include various operations as set forth above. The operations may be embodied in machine-executable instructions which cause a general-purpose or special-purpose processor to perform certain operations. Alternatively, these operations may be performed by specific hardware components that contain hardwired logic for performing the operations, or by any combination of programmed computer components and custom hardware components.

Various changes may be made in the structure and embodiments shown herein without departing from the concept of the invention. Further, features of the embodiments shown in various figures may be employed in combination with embodiments shown in other figures. Accordingly, the scope and spirit of the invention should be judged in terms of the claims which follow as well as the legal equivalents thereof.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. When a particular feature, structure, or characteristic is described in connection with an embodiment, it is submitted that it is within the knowledge of one skilled in the art to effect such a feature, structure, or characteristic in connection with other embodiments whether or not explicitly described. Various changes may be made in the structure and embodiments shown herein without departing from the principles of the invention. Further, features of the embodiments shown in various figures may be employed in combination with embodiments shown in other figures.

In the description as set forth above and claims, the terms "coupled" and "connected," along with their derivatives, may be used. It should be understood that these terms are not intended to be synonymous with each other. Rather, in particular embodiments, "connected" is used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some portions of the detailed description as set forth above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion as set forth above, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The invention also relates to apparatus for performing the operations herein. This apparatus may be specially constructed for the required purposes, or it may comprise a general purpose computer selectively activated or reconfigured by a computer program stored in the computer. Such a computer program may be stored or transmitted in a machine-readable medium, such as, but is not limited to, a machine-readable storage medium (e.g., any type of disk including floppy disks, optical disks, CD-ROMs, and magnetic-optical disks, read-only memories (ROMs), random access memories (RAMs), EPROMS, EEPROMS, flash memory, magnetic or optical cards, or any type of media suitable for storing electronic instructions), or a machine-readable transmission medium such as, but not limited to, any type of electrical, optical, acoustical or other form of propagated signals (e.g., carrier waves, infrared signals, digital signals, etc.).

The algorithms and displays presented herein are not inherently related to any particular computer system or other apparatus. Various general purpose systems may be used with programs in accordance with the teachings herein, or it may prove convenient to construct more specialized apparatuses to perform the method operations. The structure for a variety of these systems appears from the description above. In addition, the invention is not described with reference to any particular programming language. It will be appreciated that a variety of programming languages may be used to implement the teachings of the invention as described herein.

Embodiments of the invention may include various operations as set forth above or fewer operations or more operations or operations in an order which is different from the order described herein. The operations may be embodied in machine-executable instructions which cause a general-purpose or special-purpose processor to perform certain operations. Alternatively, these operations may be performed by specific hardware components that contain hardwired logic for performing the operations, or by any combination of programmed computer components and custom hardware components.

Throughout the foregoing description, for the purposes of explanation, numerous specific details were set forth in order to provide a thorough understanding of the invention. It will be apparent, however, to one skilled in the art that the invention may be practiced without some of these specific details. Accordingly, the scope and spirit of the invention should be judged in terms of the claims which follow as well as the legal equivalents thereof.

What is claimed is:

1. A method comprising:

configuring a network element to provide Internet services over a network for a plurality of Internet service subscribers including performing the following for each subscriber, receiving, by the network element, a set of substitutable subscriber-specific service attributes from a RADIUS server of an Internet service provider, wherein the set of substitutable subscriber-specific service attributes include a service name and a parameter value;

accessing, by the network element, a service profile corresponding to the service name included in the received set of substitutable subscriber-specific service attributes, the service profile configured to store service information not visible to the RADIUS server, the service information associated with the Internet services to be provided to subscribers, wherein the service information includes a dynamic service attribute, the dynamic service attribute associated with an expandable service parameter value;

dynamically converting, by the network element, the received set of substitutable subscriber-specific service attributes into a set of one or more complex internal attributes based on the stored service information, wherein the dynamically converting includes substituting the parameter value included in the set of substitutable subscriber-specific service attributes received from the RADIUS server into the expandable service parameter value associated with the dynamic service attribute within the service profile, the set of complex internal attributes to be stored internal to the network element and are used to configure a subscriber session on a communications link that couples the subscriber and an Internet service provider through the network element; and applying the set of complex internal attributes to a set of one or more components of the network element to configure the network element for the subscriber services to be provided, wherein the set of components configure the network element for the subscriber services by enforcing network policies of the communications link on a set of one or more network packet processors using the set of complex internal attributes.

2. The method of claim 1, wherein the service information further includes static service attributes, the static service attributes associated with the Internet services to be provided, wherein the static service attributes are predefined and are to configure the network element for services without dynamic conversion.

3. The method of claim 2, wherein the dynamically converting includes converting the parameter value into a data type of the dynamic service attribute.

4. The method of claim 1, wherein the set of substitutable subscriber-specific service attributes are user-defined.

5. The method of claim 1, wherein applying the set of complex internal attributes to the set of components of the network element includes sending the set of complex internal attributes to the set of components.

6. The method of claim 5, further comprising sending service accounting information associated with the subscriber services to be provided to the set of components to configure service accounting for the subscriber.

7. The method of claim 6, further comprising downloading the set of complex internal attributes directly to the set of one or more packet processors, each of the set of packet processors to perform service accounting at regular intervals and to provide notification when a network volume limit associated with the subscriber is reached.

8. The method of claim 7, wherein the set of complex internal attributes include a service interim accounting interval attribute and a service volume limit attribute.

9. The method of claim 7, wherein a service activation includes the following additional operations:

receiving a service activation request accompanying the received set of substitutable subscriber-specific service attributes over the network;

provisioning the set of complex internal attributes to the set of components, the components to configure the set of packet processors for services;

provisioning the set of complex internal attributes to the set of packet processors directly;

receiving a response from the set of components, the response including an attribute provision status;

generating a service start packet if the attribute provision status confirms the set of complex internal attributes are provisioned; and sending the service start packet to the RADIUS server over the network.

10. The method of claim 7, wherein a service deactivation includes the following additional operations:

receiving a service deactivation request accompanying the received set of substitutable subscriber-specific service attributes over the network;

locating all services to be deactivated;

un-provisioning the set of complex internal attributes associated with the subscriber services to be deactivated from the set of components;

un-provisioning the set of complex internal attributes associated with the subscriber services to be deactivated from the set of packet processors;

receiving final accounting counters for the subscriber services to be deactivated if accounting is enabled for the subscriber services;

generating a service accounting stop packet, the service accounting stop packet including a service duration; and sending the service accounting stop packet to the RADIUS server over the network.

11. The method of claim 1, further including providing response packets to the RADIUS server including caching of the response packets in a cache memory.

12. A non-transitory computer readable medium implemented by a network element that provides instructions, which when executed by the network element, cause the network element to perform operations, the operations comprising:

receiving, by the network element, a set of substitutable subscriber-specific service attributes from a RADIUS server of an Internet service provider, wherein the set of substitutable subscriber-specific service attributes include a service name and a parameter value;

accessing, by the network element, a service profile corresponding to the service name included in the received set of substitutable subscriber-specific service attributes, the service profile configured to store service information not visible to the RADIUS server, the service information associated with the Internet services to be provided to subscribers, wherein the service information includes a dynamic service attribute, the dynamic service attribute associated with an expandable service parameter value;

dynamically converting, by the network element, the received set of substitutable subscriber-specific service attributes into a set of one or more complex internal attributes based on the stored service information, wherein the dynamically converting includes substituting the parameter value included in the set of substitutable subscriber-specific service attributes received from the RADIUS server into the expandable service parameter value associated with the dynamic service attribute within the service profile, the set of complex internal attributes to be stored internal to the network element and are used to configure a subscriber session on a communications link that couples the subscriber and an Internet service provider through the network element; and applying the set of complex internal attributes to a set of one or more components of the network element to configure the network element for the subscriber services to be provided, wherein the set of components configure the network element for the subscriber services by enforcing network policies of the communications link on a set of one or more network packet processors using the set of complex internal attributes.

13. The medium of claim 12, wherein the service information further includes static service attributes, the static service attributes associated with the services to be provided, wherein the static service attributes are predefined and are to configure the network element for services without dynamic conversion.

14. The medium of claim 13, wherein the dynamically converting includes converting the parameter value into a data type of the dynamic service attribute.

15. A network element comprising:
a communications link that couples a subscriber and an Internet service provider through the network element;
a dynamic service attribute convertor including:
a set of one or more service profiles, each service profile corresponding to an Internet service to be configured on the network element, the set of service profiles each to provide a placeholder to store service information associated with the service; a service profile parser to receive a set of substitutable subscriber-specific service attributes from a RADIUS server wherein the set of substitutable subscriber-specific service attributes include a service name and a parameter value, and the service profile parser including:
a profile access component to detect the set of substitutable subscriber-specific service attributes and to access a service profile corresponding to the service name included in detected set of substitutable service attributes and to pass the service information associated with the service to be configured within the service profile, wherein the service information includes a dynamic service attribute, the dynamic service attribute associated with an expandable service parameter value; and
a service parameter expander to receive the passed service information associated with the service to be configured and to dynamically convert the received set of substitutable subscriber-specific service attributes into a set of one or more complex internal attributes, wherein the dynamically converting includes substituting the parameter value included in the set of substitutable subscriber-specific service attributes received from the RADIUS server into the expandable service parameter value associated with the dynamic service attribute within the service profile, the set of complex internal attributes are used to configure a subscriber session on the communications link; and
a packet processor to enforce network policies of the communications link using the set of complex internal attributes.

16. The network element of claim 15, further comprising a local per-subscriber memory to store the set of complex internal attributes.

17. The network element of claim 15, wherein the service information further includes static service attributes, the static service attributes associated with the Internet service to be provided, wherein the static service attributes are predefined and are to configure the network element for services without dynamic conversion.

18. The network element of claim 17, wherein the set of substitutable subscriber-specific service attributes being dynamically converted into the set of complex internal attributes comprises converting the parameter value into a data type of the dynamic service attribute.

* * * * *